(12) United States Patent
Carleson et al.

(10) Patent No.: US 6,848,396 B2
(45) Date of Patent: Feb. 1, 2005

(54) PET TOYS AND METHOD AND APPARATUS FOR THEIR MANUFACTURE

(75) Inventors: Kathryn M. Carleson, Sandy, UT (US); Wendy Ricci, Stansbury Park, UT (US)

(73) Assignee: The Bird Toy Box, Inc., Stansbury Park, UT (US)

(*) Notice: Subject to any disclaimer, the term of this patent is extended or adjusted under 35 U.S.C. 154(b) by 5 days.

(21) Appl. No.: 10/621,720

(22) Filed: Jul. 16, 2003

(65) Prior Publication Data

US 2004/0025800 A1 Feb. 12, 2004

Related U.S. Application Data

(60) Provisional application No. 60/397,546, filed on Jul. 22, 2002.

(51) Int. Cl.[7] ............................................. A01K 15/02
(52) U.S. Cl. ...................................................... 119/702
(58) Field of Search .............................. 119/702, 703; 264/339

(56) References Cited

U.S. PATENT DOCUMENTS

| | | | | |
|---|---|---|---|---|
| 4,641,835 A | * | 2/1987 | Christenson | 472/120 |
| 4,797,242 A | * | 1/1989 | Fukuda et al. | 264/108 |
| 5,160,685 A | * | 11/1992 | Moran, Jr. | 264/237 |
| 5,550,720 A | * | 8/1996 | Carroll | 362/123 |
| 5,678,890 A | * | 10/1997 | Tenbroeck | 297/271.6 |
| 5,782,207 A | * | 7/1998 | Goodham | 119/707 |
| 6,161,320 A | * | 12/2000 | Peterson | 40/605 |
| 6,705,974 B1 | * | 3/2004 | Tardif | 482/39 |
| 2002/0026902 A1 | | 3/2002 | LaFeber | |
| 2003/0054738 A1 | * | 3/2003 | Feely | 451/51 |
| 2003/0101922 A1 | * | 6/2003 | Jenkinson et al. | 116/206 |
| 2003/0204983 A1 | * | 11/2003 | Porter | 43/3 |

FOREIGN PATENT DOCUMENTS

SU                1459922 A   *  9/1986

OTHER PUBLICATIONS

U.S. Appl. No. 09/934,815, filed Aug. 22, 2001, inventor LaFeber.

* cited by examiner

*Primary Examiner*—Michael J. Carone
*Assistant Examiner*—Jordan Lofdahl
(74) *Attorney, Agent, or Firm*—M. Reid Russell

(57) ABSTRACT

A pet toy formed from a section or sections of polyvinyl chloride (PVC) pipe and/or tube, preferably white polyvinyl chloride PVC water sprinkler pipe, that is grooved longitudinally, at random intervals therearound, and its surface is heated, with an open flame such as a flame generated by a propane torch, to darken the surface to a shade or shades of brown and to roughen the surface. The pipe or tube is spot heated and bent at that heated spot into a desired toy shape, and one toy shape is has the pipe or tube ends aligned and are joined, providing a toy with an open center area that is suitable as a bird perch and is fitted with a hanger for suspending it and may be drilled to receive a cord or cords fitted therethrough that toy pieces, such as sections of colored wood, plastic or other materials, are threaded on.

6 Claims, 8 Drawing Sheets

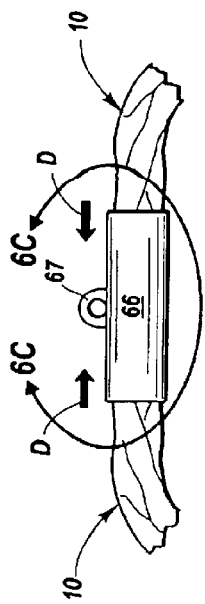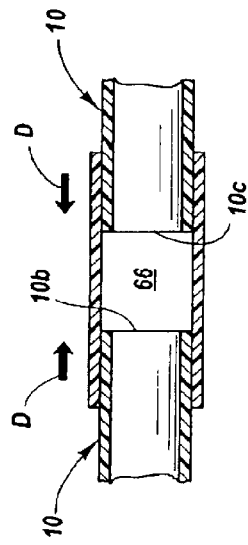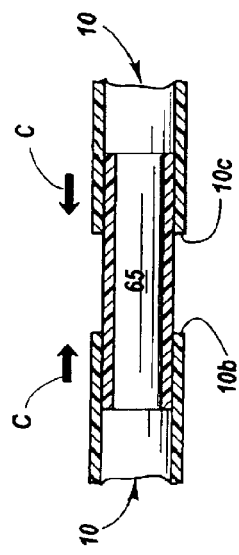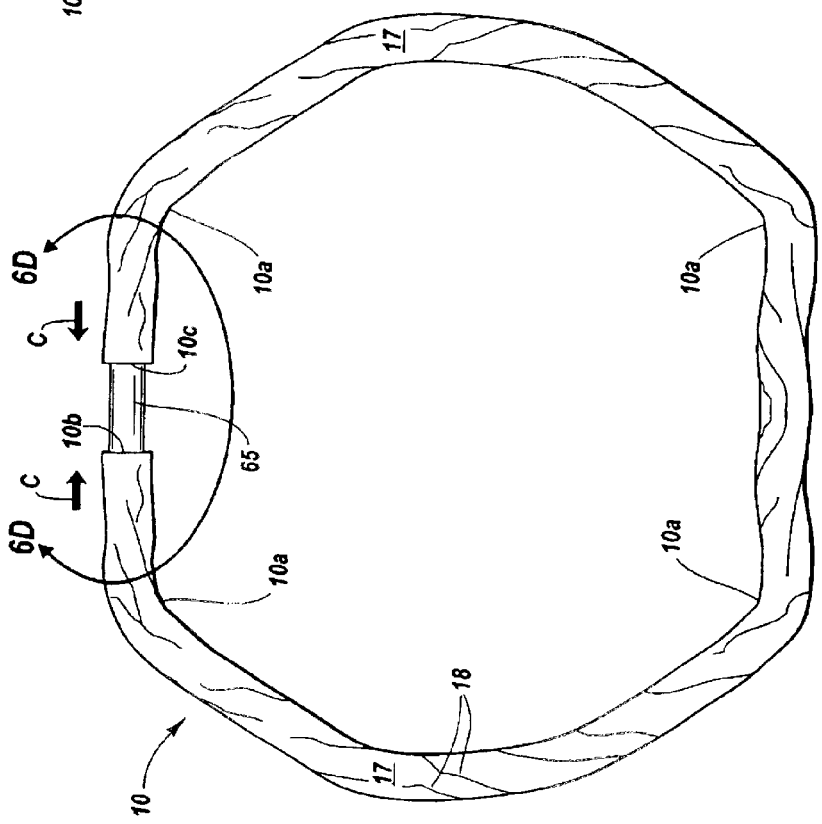

PET TOYS AND METHOD AND APPARATUS FOR THEIR MANUFACTURE

This appln. claims benefit of 60/397,546 filed Jul. 22, 2002.

BACKGROUND OF THE INVENTION

1. Field of the Invention

The present invention relates to pet toys appropriate for birds and small animals formed from treated plastic pipe, tubes, and the like, their method of manufacture and system for their manufacture.

2. Prior Art

Pet toys and perches, particularly for large and small birds, have traditionally been formed from wood and leather as mainstay materials. Wood and leather are safe materials for such uses as they are non-toxic, esthetically pleasing, have surface textures that facilitates gripping by a pet, particularly a bird, and can be easily handled by the pet owner, even when wet. Recently plastic tubing and/or plastic rods have come to be used as materials for the fabrication of pet toys, that use both as flexible and rigid tubing, or are formed as castings. While a use of plastic materials has certain advantages for use in a of pet toys such as: plastic materials are easy to obtain, are inexpensive; and are comparatively easy to work with. Plastic materials also provide advantages to a toy purchaser in that: the toy has a comparatively long useful life; is easy to clean, is lighter in weight than wood or leather; and is generally non-toxic to a pet. While, plastic tubing and/or plastic rods are available in many colors, and while such plastic tubing and/or plastic rods are hard, flat, and have smooth surfaces that may be attractive to pet owners, pets and pet handlers, when such toy surface is wet, a pet may find that surfaces difficult to negotiate and slippery. Also, of course, such flat, shiny and smooth toy surface does not look like a natural material, such as a tree branch, nor will such provide a good gripping surface for the pet, particularly a bird. While a use of plastic tubing and/or plastic rods clearly provide ease of manufacturing and economic benefits, prior to the invention, a toy manufactured from such material presented an unacceptable gripping surface to a pet, particularly a bird, thereby making its use for bird toys, unacceptable. The present invention, however, overcomes the toy appearance and lack of roughened surface problems by grooving, in a random manner, the plastic pipe and/or tube outer surface and roughening that outer surface by a heat treatment. This treatment can be performed using both manual methods and in an automated system, producing pet toys that have both a firming gripping outer surface and present a wood-like appearance that is pleasing to both the pet and the pet owner.

As set out above, pet toys as are in common use have, in the past, generally been manufactured from wood or leather, and more recently, some toys have been formed from plastic materials. Further, a recent U.S. Pat. No. 6,513,455, to LaFeber, III, sets out a use of molded paper pulp. Toys made from such paper pulp are non-toxic and can be dyed with a non-toxic ink to present a desired appearance. Such paper pulp toys, like the invention, can present a surface texture to both simulate a natural material, such as wood, and to provide a gripping surface to the pet. However, they do not involve a use of a like material, manufacturing procedures or system of manufacture, that are like those of the invention.

SUMMARY OF THE INVENTION

The invention is in pet toys, particularly perch-type toys for birds, that are formed from plastic pipe and/or tubing, particularly polyvinyl chloride (PVC) pipe and/or tubing, and are textured and colored to resemble wood. Where some earlier toys have utilized plastic in their manufacture, such has not provided a roughened surface nor have they been scored to provide a safe gripping surface for the pet. Further, additional to the roughened surface the treated surface provides for darkening that surface from its usual white surface to varying shades of brown, giving the plastic pipe and/or tube a wood surface appearance. The processed plastic pipe and/or tube is then bent, or otherwise formed, into a shape of the pet toy, such as a bird perch.

The method of the invention for processing plastic pipe and/or plastic tubing involves both scoring, as by longitudinally grooving with a hand tool or machine, the plastic pipe and/or tube along its outer surface, at randomly spaced intervals, and scorching the pipe and/or tube surface, as with a flame from a torch. In which scorching, each area or section of the plastic pipe and/or tube is exposed to the torch flame for a very short period of time, with that scorching, for a white plastic pipe and/or tube, providing a roughening and darkening of that surface. The grooving and heat treating is practiced along the entire plastic pipe and/or tube outer surface. To form the treated plastic pipe and/or tube into a toy requires a further heat application to spots on small sections to the plastic pipe and/or tube, with portions of the pipe and/or tube, on either side of the heated spot, then bent toward one another, to form the pipe and/or tube into a desired shape for the toy as is under construction. This bending procedure can be practiced at spaced intervals along the plastic pipe and/or tube to where the bent pipe ends align for joining into a ring, forming a perch that can be fitted with a hanger for suspending the toy. Or, in another toy arrangement, such grooved and heat treated plastic pipe and/or tube can be drilled to accommodate dowels fitted therethrough to serve as individual bird perches with the pipe and/or tube hung by one end. In practice, pet toys, and in particular bird toys of the invention, are fabricated from plastic pipe and/or tubes, preferably polyvinyl chloride (PVC) pipes and/or tubes to have a wood-like outer texture and color that are both pleasing to the purchaser and will provide non-slip surface for gripping by a bird's feet, even when that surface is wet.

To fabricate the toys, an operator can manually score a straight PVC pipe and/or tube outer surface with longitudinal irregular grooves. Alternatively, the grooves can be machined into the pipe and/or tube surface, and the pipe and/or tube is then scorched over its outer surface by exposure to an open flame, with each section of the surface exposed to an open flame held thereover for a very short period of time. Such application of flame can be accomplished with a torch, such as a propane torch, and provides for both a darkening and roughening of the plastic pipe and/or tube surface, simulating wood. In practice, a grooving tool, or a hand piece turning a diamond disk or grooving bit has been used to manually slot or groove the pipe and/or tube, and a hand piece that has been extensively used to groove such pipe and/or tube is known as a Dremel tool that includes an electric motor turning a shaft that extends out from its forward end that a disk, such as a diamond edged disk, is mounted onto. In practice, after grooving, the pipe and/or tube outer surface is scorched utilizing a propane torch whose burner end is moved over the pipe or tube surface, exposing individual areas or sections thereof for approximately a second per each area or section, providing a uniform scorching of the surface that results in a color change from a white PVBC pipe and/or tube surface to brown, lending a wood appearance to the surface texture as well an roughening it. It should further be understood that, in addition to manually scoring or grooving and heating to scorch the pipe and/or tube surface, the invention can be practiced by a system that scores or grooves and scorches the pipe and/or tube surface, in sequential steps, and one such system utilizes a ring shaped tool mount whereto are radially inwardly fitted, in spaced relationship, a plurality of gouging tools with the distance between gouging tools ends being less than the pipe or tube diameter. Thereby, a pipe and/or tube that is pulled through the ring shaped tool mount will be grooved or slotted longitudinally, and which ring shaped tool mount can be slowly rotated in first one direction and then another as the pipe and/or tube is pulled therethrough, providing curved grooves. Thereafter, the plastic pipe and/or tube is scorched over its surface by exposure to one or more flames directed thereagainst as by a torch or torches, completing the surface treatment.

For bending the treaded pipes or tubes, spots or areas of the pipe and/or tube are individually heated for bending at those spots or areas. To bend the pipe and/or tube to a desired shape, sections on each side of the heated spots are bent to a desired angle over an object having a curved, edge, or other surface, forming the pipe and/or tube into a desired shape. Such shape can be a ring with the ends aligned to receive a coupling for joining them together. Thereafter, the ring or other shape of toy, can be drilled to receive hardware fitted thereto for suspending the toy or for mounting items, such as strings of non-toxic beads, or the like, therefrom.

It is a principal object of the present invention to provide a pet toy, in particular a bird toy, having an outer surface, and the surface is grooved or slotted longitudinally, in a random pattern and has been scorched to darken and roughened the surface and provide the toy with a wood-like appearance, as well as giving the bird a perch it can safely hold onto, even when the toy is wet.

Another object of the present invention is to provide a pet toy, particularly a bird toy, formed from white polyvinyl chloride (PVC) pipes and/or tubes, where the pipe or tube outer surface has been randomly grooved or slotted longitudinally, and has been treated to darken and roughen that outer surface to resemble wood, and provides a secure perch to a bird, even when the toy is wet.

Another object of the present invention is to provide a method for manufacture of pet toys, particularly toys for birds, where the pet can securely grip the toy surface with their feet, that includes polyvinyl chloride (PVC) pipes and/or tubes are grooved or slotted longitudinally with random spacing of the slots, and the surface is treated to darken and roughen it to where it has a wood-like appearance.

Still another object of the present invention is to provide a method for manually fabricating pet toys where, with a polyvinyl chloride (PVC) plastic pipe and/or tube is held so as to allow an operator to conveniently groove or score the outer pipe or tube surface longitudinally, at random intervals, with the pipe or tube surface thereafter exposed to heat, as from a propane torch tip that is held over a pipe or tube area or section of surface, for a very short time interval of approximately a second per area or section, both scorching that surface from a white to a brown color and roughening it so as to provide the pet with a gripping surface, whereafter the pipe or tube can be bent or otherwise formed into a shape of a pet toy, and can be drilled, or otherwise arranged, to provide for hanging the toy.

Still another object of the present invention is to provide a mechanical system for economically manufacturing pet toy where a polyvinyl chloride (PVC) plastic pipe and/or tube, that is preferably white in color, is longitudinally grooved or slotted, at random spaced intervals, and its surface is scorched to a brown color and is roughed to provide a secure perch for a pet, even when the surface is wet, and the pipe or tube can be formed into different shapes as are appropriate for a particular pet toy.

BRIEF DESCRIPTION OF THE DRAWINGS

These and other objects and features of the present invention will become more apparent from the following description in which the invention is described in detail in conjunction with the accompanying drawings:

FIG. 6A shows the section of grooved and scorched PVC pipe after sections thereof have been bent to where the pipe ends align and receive a dowel fitted into which ends that are urged over the dowel and are maintained together, shown as arrows C, forming a closed hexagon shaped ring;

FIG. 6B shows the ends of the PVC pipe of FIG. 6A being fitted into a sleeve, shown by arrows D;

FIG. 6C is a sectional view of the tube end to end coupling taken within the line 6C—6C of FIG. 6B;

FIG. 6D is a sectional view of the tube end to end coupling, taken within the line 6D—6D of FIG. 6A;

DETAILED DESCRIPTION

Figure 5:
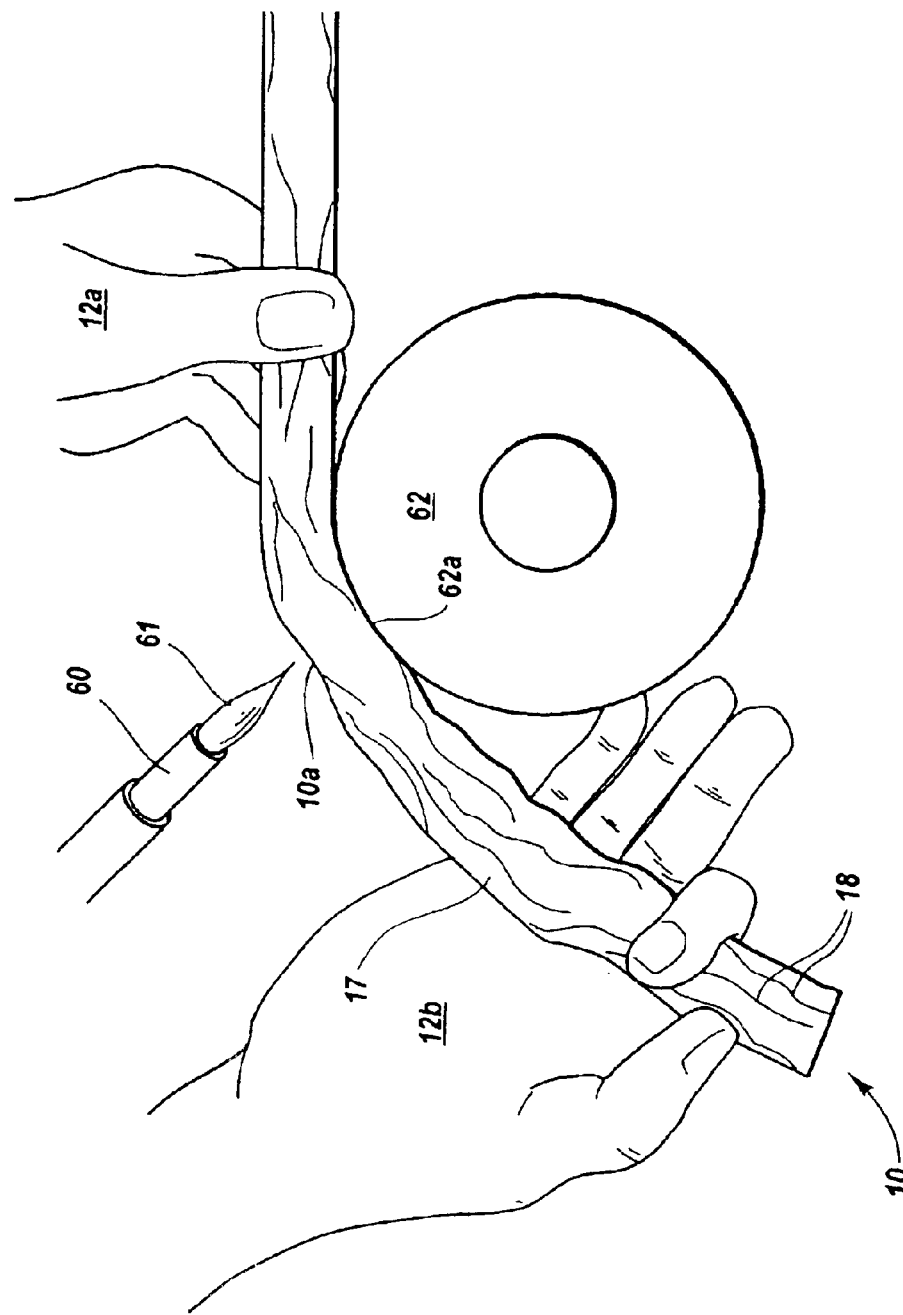
FIG. 5 shows a section of PVC pipe that has been grooved and scorched to both color the pipe surface to brown shades and tp roughen the pipe surface, and shows in an operator's hands holding the pipe on either side a a pipe area that has been heated, and presses the pipe against a round surface, to bend the pipe, with a heat source, shown as a burner nozzle, shown directing a flame onto a spot on the pipe at the bend, facilitating pipe bending.

The invention, as is hereinafter described, relates to pet toys and, in particular, to bird toys that are formed from plastic pipe and/or tubes, preferably white polyvinyl chloride (PVC) pipe and/or tube, and involves the treatment of the plastic pipe or tube surface to provide a wood-like appearance and texture to the toy surface that will afford a pet, particularly a bird, a firm grip on the surface. In practice, the invention preferably utilizes white polyvinyl chloride (PVC) pipe and/or tube, like that commonly used as water sprinkler pipe, and provides for the pipe surface being both scored and grooved longitudinally, in a random pattern of grooves therealong, and is scorched, as with an open flame like that generated by a propane torch. The torch flame is played over the pipe or tube surface for approximately one second per area or section of the pipe or tube. A light scorching is thereby formed on the surface, turning it from white to a light brown in color. The pipe or tube scoring or grooving along with the light brown scorching produces a surface having a wood-like appearance. Also, the surface by the scorching, is transformed from being slick to one that is a slightly roughened to provide a gripping surface for a pets feet. After the pipe or tube grooving and scorching which surface treatments, the pipe or tube can be bent, as by applying spot heat to where an operator determines to form a joint, with the operator, holding the pipe or tube on opposite sides of that heated area, then manually bending that pipe or tube over an object, such as the cylinder, as shown in FIG. 5. In practice, the operator will make a number or bends as determined by shape of the toy being formed, even to bending the pipe or tube ends into alignment with one another to be fastened together.

Figure 1:
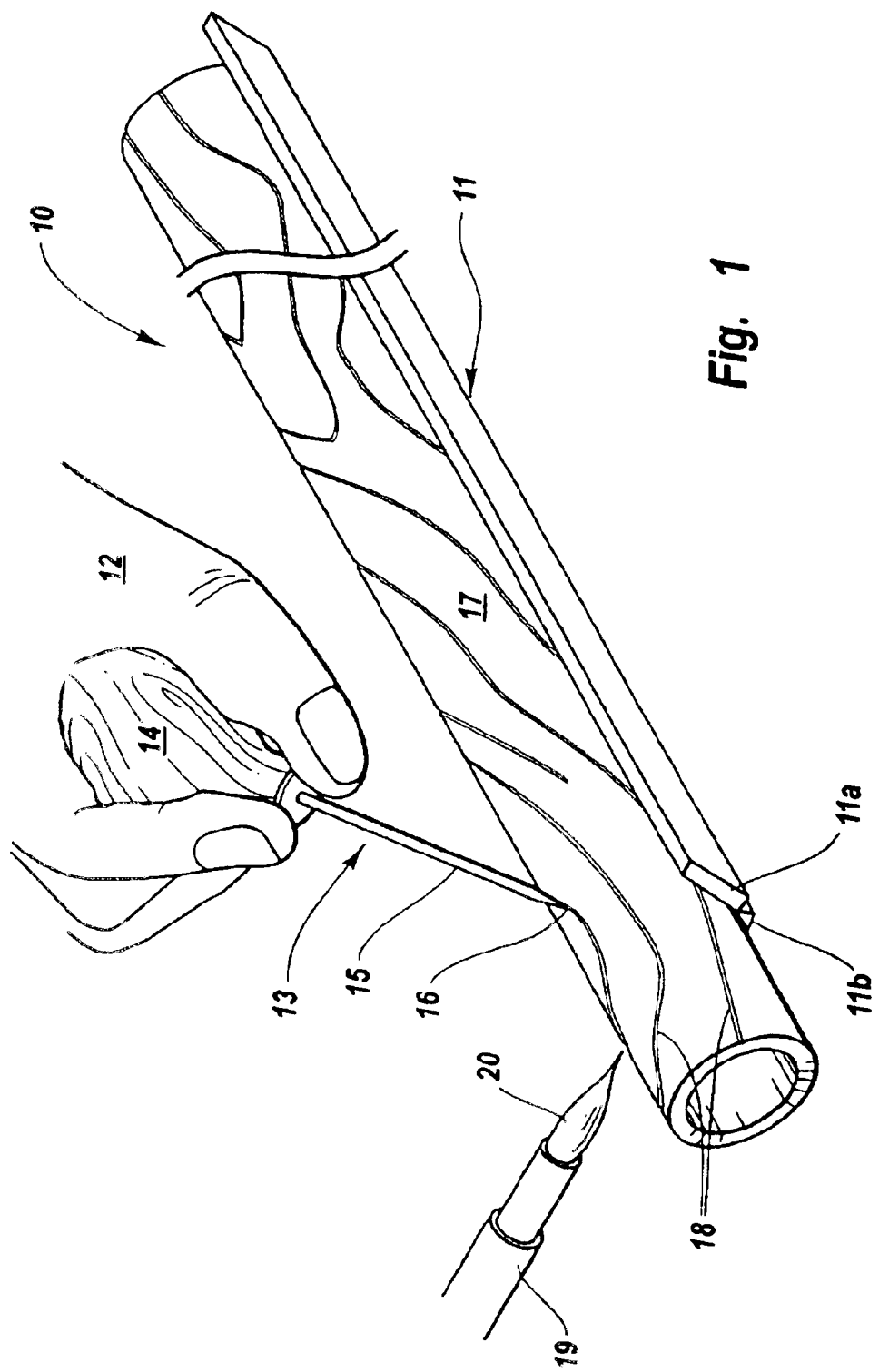
FIG. 1 is a front elevation perspective view taken from a left end of a section of a polyvinyl chloride (PVC) pipe that is held in place in a trough and is scored or grooved by an operator who holds a gouging tool handle in their hand and pulls the tool gouging end along the pipe, making irregular and random grooves or slots therein, and showing a burner nozzle end projecting a flame therefrom onto the pipe surface, illustrating pipe scorching.

FIG. 1 shows a section of pipe, that is preferably a section of a white polyvinyl chloride (PVC) pipe 10 like that used in a lawn sprinkling system, and is maintained in a trough-shaped holder 11. The trough shaped holder 11 includes sides 11a and 11b that can, as needed, be roughened, for supporting and steadying the pipe while an operator, shown as hand 12. So maintained, an operator, holding a handle end 14 of a gouge tool 13, pulls or pushes a gouge cutting end 16, shown as a point, of a tool shaft 15, along the pipe 10 outer surface 17. Slots or grooves 18 are thereby formed longitudinally therein, at random distances from one another. The trough 11 includes the like sides 11a and 11b that are joined at a right angle, along common edges, to receive and support pipe 10 therein as the pipe is grooved. So arranged, an operator can quickly and easily turn or lift the pipe and score or groove the entire pipe 10 surface area and then remove it. The trough 11 can be supported onto a stand, not shown, or can be otherwise supported, within the scope of this disclosure. Or, the trough can be dispensed with and the section of pipe 10 otherwise supported, as for example, in an open area between boards of a wooden table, or the like.

After slotting, the pipe 10 outer surface 17 is heated, illustrated by a torch burner end 19 wherefrom a flame 20 projects. In practice, the flame 20 is moved over the entire pipe 10 outer surface, heating each area thereof, in turn, for approximately one (1) second, to produce a light scorching of that surface. The scorching produces a brown surface coloration and roughening. The pipe surface 17 coloration, from exposure to flame 20, will not be uniform, and the slots or grooves 18 will be a lighter shade of brown, with the combination providing a surface appearance that is both pleasing to an owner and has a wood-like appearance. The scorching further provides a roughening of the pipe surface to produce a secure gripping surface to a pet's feet., even when the surface is wet.

Figure 2:
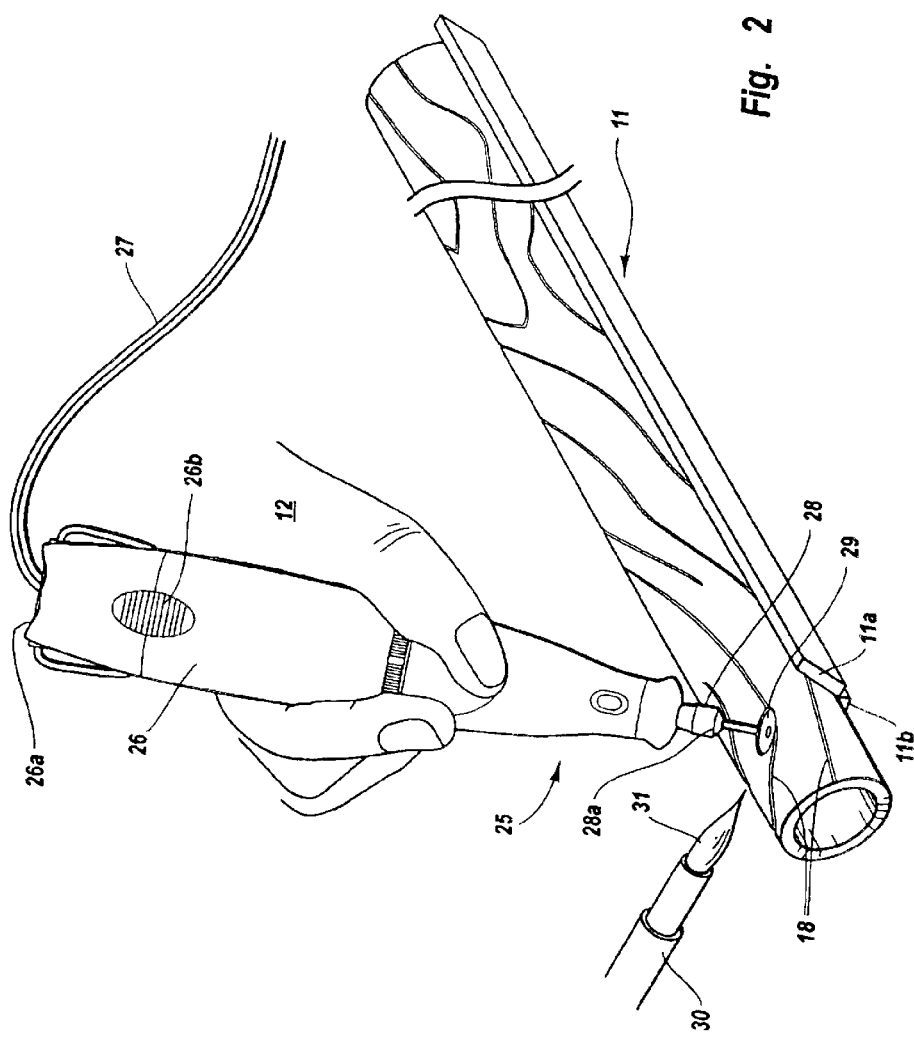
FIG. 2 shows a view like that of FIG. 1 of a PVC pipe maintained in a trough with an operator, shown as a hand, holding a grip end of an electric motor drive hand piece that turns a shaft having a cutting disk mounted across its end that is shown being guided along the pipe surface to randomly slot or groove the pipe surface.

FIG. 2 shows a same trough 11 with side walls 11a and 11b connected at right angles and has received a section of pipe 10 positioned therein. Grooves 18, like the grooves 18 of FIG. 1, are shown being formed utilizing a hand piece 25 that an operator holds in their hand 12. As shown, the hand piece 25 includes an electric cord 27 connecting into a rear end 26a of a cylindrical housing 26 that is gripped by the operators' hand 12. That electrical cord 27 is connected within the housing to an electric motor, not shown, that turns a shaft 28 that is journaled through the housing 26 forward end 26b. The shaft 28, as shown, releasably mounts a cutting disk 29 fitted into, to extend across the end of, a chuck end 28a. The electric motor is engaged to turn the chuck end 28a, by operation of a switch 26a, or by plugging the electrical cord 27 end into an electrical receptacle, not shown. The operator guides the turning cutting disk 29 outer edge along the pipe 10 surface 17, forming the longitudinal grooves 18 therein. In practice a hand piece that has been used to groove the pipe surface is known as a Dremel though, it should be understood, other tools that are electric or pneumatic could be so used within the scope of this disclosure.

After the section of PVC pipe 10 is grooved, like the pipe of FIG. 1, the pipe 10 surface 17 is heated, preferably by playing a flame thereover shown as a torch tip 30 wherefrom an open flame 31 projects. An operator, to scorch the pipe 10 surface, exposes areas on the pipe surface for approximately one (1) second for each area, lightly scorching the surface and produces like the pipe or tube described above with respect to FIG. 1.

Figure 3:
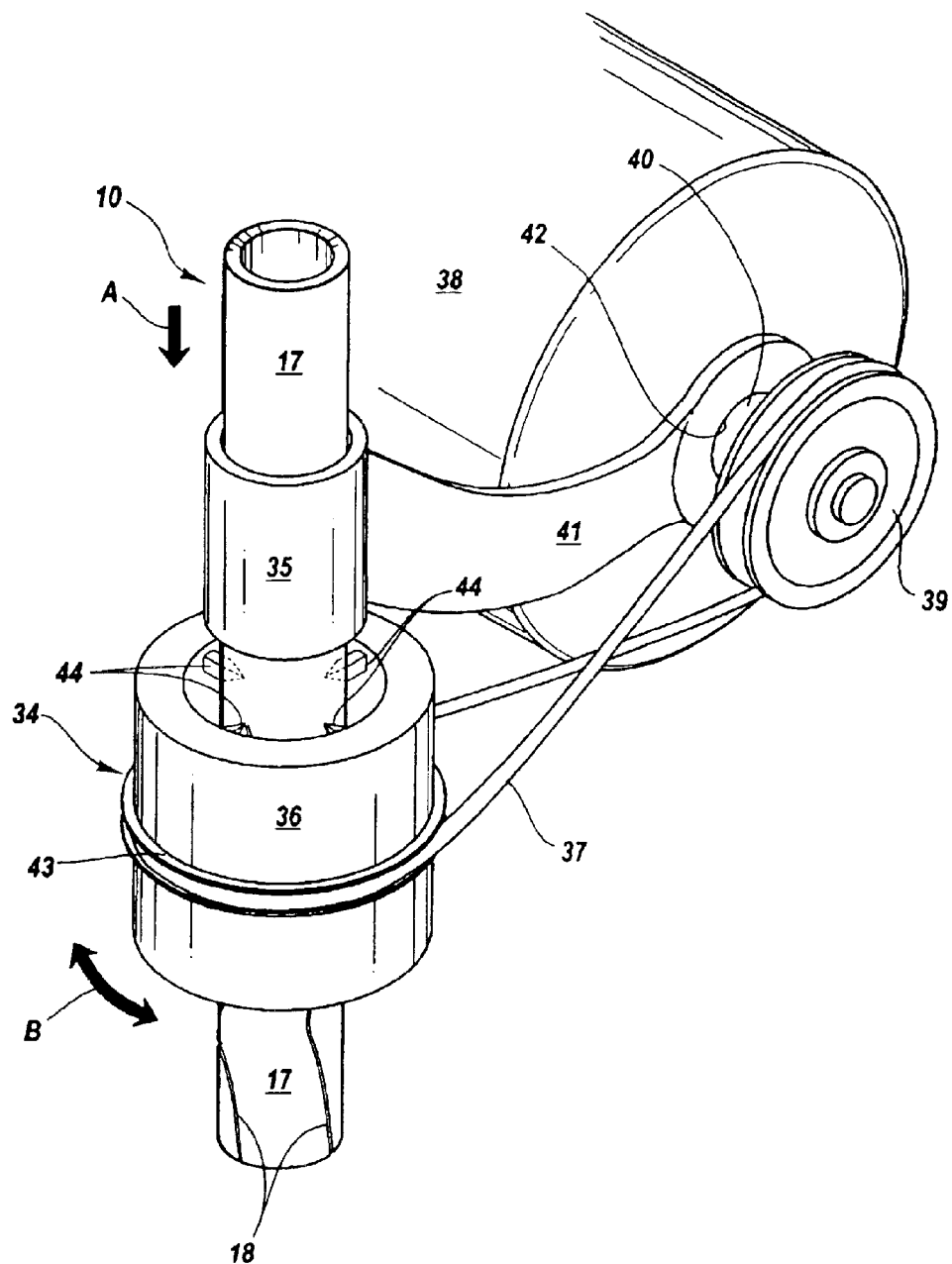
FIG. 3 is a side elevation perspective view taken from the front and left side of an automated mechanical system for scoring or grooving the PVC pipe of FIG. 1, that includes a schematic of a motor with pipe guide extending therefrom that the PVC pipe is fitted to travel through, shown as arrow A, to pass through a tool ring that mounts radially inwardly extending grooving tools, and which tool ring is fitted through a belt that passes over a pulley that is turned on a motor shaft, the pulley to turn back and forth and turn also the tool ring back and forth, as illustrated by double headed arrow B.

FIG. 3 shows a system 34 for slotting or grooving and scorching the PVC pipe 10 in preparation for the pipe or tube being formed into a pet toy. FIG. 3 shows the white PVC plastic pipe 10 fitted vertically through a cylindrical guide 35 to pass through a tool ring 36. The tool ring 36 is shown connected to be turned through a belt 37 that is passed around a pulley 39 that is turned through a shaft 40 of an electric motor 38. The motor shaft 40 is shown journaled through an opening 42 formed through one end of a bracket 41 that mounts the cylindrical guide 35 on its other end. The belt 37 is passed over the motor pulley 39, crossing upon itself at the belt center, and is fitted around a belt guide 43 that is positioned around the tool ring 36. So arranged, turning of the electric motor pulley 39 turns also the tool ring 36. Except the direction of turning of the pulley and tool ring are opposite, and, when the pulley is turning clock-wise, the tool ring will be turned counter-clock-wise. In practice, the electric motor is arranged to turn in one direction and is then reversed to turn in the other direction, with the belt 37 therefore to turn the tool ring 36 first in one direction and then in the other, as illustrated by double headed arrow B. Which motor and pulley turning, it should be understood, is very slow, and is coordinated with the speed that the PVC pipe 10 is being pulled through the tool ring 36, illustrated as Arrow A.

The tool ring 36, to provide scoring or grooving of the pipe 17 is pulled therethrough includes a plurality of grooving tools or bits 44 that are individually fitted into the tool ring 36, around the inner circumference, and extending radially towards the tool ring center, and may, but need not be, spaced equidistant from one another. So arranged, as the pipe 10 is moved through the tool ring 34, as illustrated by arrow A, the grooving tools 44 ends, that are shown to be pointed, gouge into the pipe surface 17 forming grooves 18. While the groove tools 44 ends are shown to be pointed, they may be otherwise formed, such as, for example, like metal lathe tool bits, to provide a desired groove width and depth, within the scope of this disclosure. The grooves 18, with the back and forth rotation of the tool ring 36, as illustrated by double arrow B, are curved. The travel of the pipe 10 through the tool ring 36 can be accomplished manually or, by fitting a plug in the pipe end that is first extruded from the tool ring and connecting a tether thereto. The tether can be pulled manually or can be fitted over a separate pulley, not shown, with that pulley to be turned at a desired rate to pull the pipe through the tool ring 36, in coordination with the back and forth travel of the tool ring, illustrated by double arrow B.

After passage of the PVC pipe 10 through the tool ring 36, to score or groove the pipe surface 17 with grooves 18, the pipe surface can be further manually grooved, as illustrate above with reference to FIGS. 1 and 2, to provide random spacing and intersection of the grooves, lending a natural wood appearance thereto. Further, the pipe surface 17 can then be scorched, as discussed above with respect to FIGS. 1 and 2.

Figure 4:
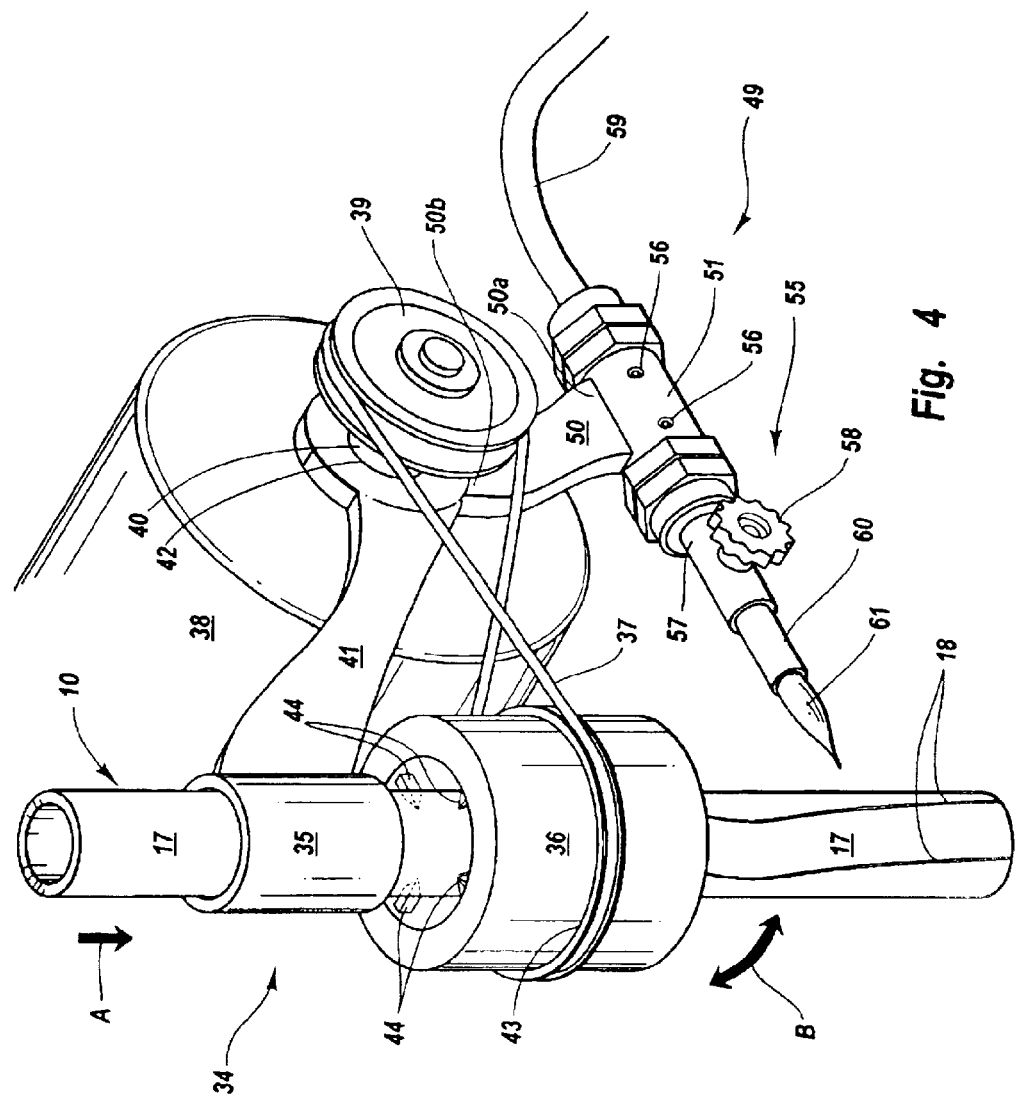
FIG. 4 shows the automated system of FIG. 2 with a heat source mounted to extend from the motor and to project a flame out from a nozzle end thereof onto the pipe surface after it has passed through, and has been grooved in, the tool ring.

Alternatively, to manually scorching the pipe surface 17, FIG. 4 illustrates a burner assembly 49, that is a scorching component of system 34, and is arranged with, and operated in conjunction with, the components of the system 34 of FIG. 3, as discussed above. Shown in FIG. 4, the system 34 further includes an arm 50 that is secured on one end 50a to the bracket 41 edge that mounts to motor 38, extends alongside and across the tool ring 36 and has a torch ring shaped mount 51 secured across its other end 50a. A gas torch 55, such as a propane torch, is fitted through the torch ring shaped mount 51 and is held therein by a turning of a set screws 56 into engagement with the body 57 of the torch. The torch body 57 includes a knob 58, that extends outwardly therefrom, and is manually turned for adjusting the gas flow passed from a gas line 59 and out of a nozzle or tip end 60 where it is lit and produces a flame 61. The flame 61 is moved over the pipe 10 surface 17 as is travels, shown as arrow A, through the tool ring 36 that is pivoting back and forth, as illustrated by double arrow B. In practice, to expose the entire surface 17 of the pipe 10, more than one burner assembly 49 may be required, with each burner assembly arm 50 connected, at spaced intervals apart from one another, either vertically or horizontally.

It should be understood that the systems 34 shown in FIGS. 3 and 4 are schematics of automated mechanical systems that are operated to produce a section of PVC pipe 10 that has been grooved and scorched so as to provide a wood-like surface 17 for use in manufacturing pet toys. It should also, however, be understood, that other arrangements or components for grooving and scorching the pipe 10 surface 17, used as described, will fall within the scope of this disclosure.

For bending sections of PVC pipe 10 that have been grooved at 18 and has had its surface 17 scorched, as shown in FIG. 5, an operator, shown as hands 12a and 12b, holds the pipe 10 on opposite sides of an area 10a that is to be bent and has been heated to soften the PVC at that area 10a. Such area 10a heating is preferably provided by a burner tip 60 wherefrom a flame 61 is directed onto the pipe surface area 10a. To bend the pipe 10, the operator holds the pipe 10 in their hands 12a and 12b and forces the heated pipe area 10a against an outer surface 62a of a mandrel 62, shown here as a cylinder, and bends the pipe around that cylindrical surface to a desired angle. While the mandrel 62 is shown here as a cylinder it should be understood, that another shape of mandrel 62, such as a mandrel with or having a sharp edge, could be so used within the scope of this disclosure, to form a desired pipe angle with a sharper bend.

FIG. 6A shows a PVC pipe 10, that has had its surface 17 grooved at 18 and has been scorched as described above, and has been bent at spaced areas 10a to where the pipe end 10b and 10c align to be fitted together. A dowel 65 is provided for fitting into the pipe ends 10b and 10c, that are slid onto the dowel, as illustrated by arrows C. The dowel 65 surface preferably provides a snug fit into the pipe ends and, as required to provide a permanent coupling, can receive a coating of an adhesive applied thereon prior to receiving the pipe ends, providing a permanent coupling.

FIG. 6B shows the PVC pipe ends as having been fitted into a sleeve 66, shown as arrows D, with the interior surface of which sleeve 66 and pipe ends preferably coated with an adhesive, as required, to maintained the pipe 10 end 10b to end 10c coupling. Further, for convenience, the sleeve can include an eyelet 67 formed to extend out from the sleeve surface for receiving a hook, or the like, fitted therethrough, for hanging the toy.

FIG. 6C is a sectional view taken within the line 6C—6C of FIG. 6B, showing a cross-sectional view of the PVC pipe 10 ends 10b and 10c that are coupled to sleeve 66, and FIG. 6D is a sectional view taken within the line 6D—6D of FIG. 6A, showing a cross sectional view of the PVC pipe 10 ends 10b and 10c coupled to dowel 65.

Figure 7:
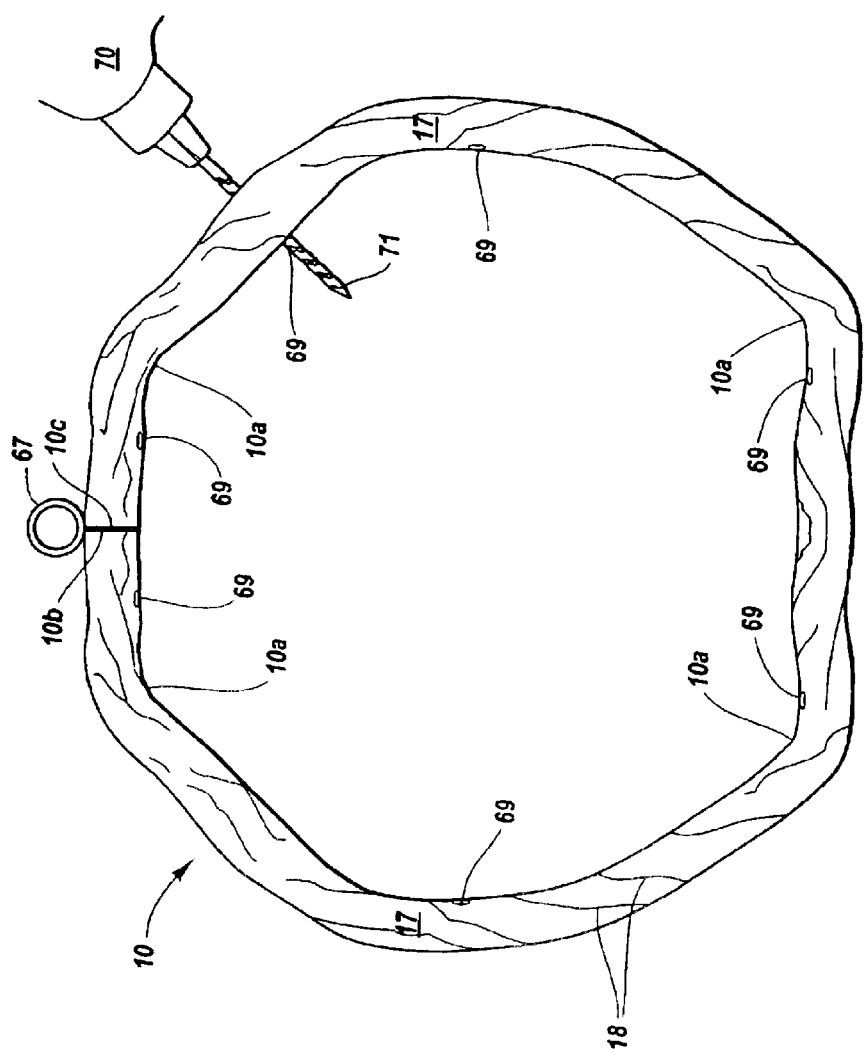
FIG. 7 shows the hexagon shaped ring of FIG. 6A being drilled laterally therethrough.

FIG. 7 shows the PVC pipe 10 that has had its surface 17 grooved at 18 has been scorched, and bent at areas 10a therealong, to where its ends 10b and 10c align and are coupled together utilizing the sleeve 66, shown in FIGS. 6B and 6C, and includes the eyelet 67. A closed hexagon shaped toy is thereby formed. The toy is shown as having spaced holes 69 drilled at intervals thereacross, as by an electric drill 70 turning a bit 71, with the holes 69 to receive hangers, such as sections of cord, such as leather cords, passed therethrough.

Figure 8:
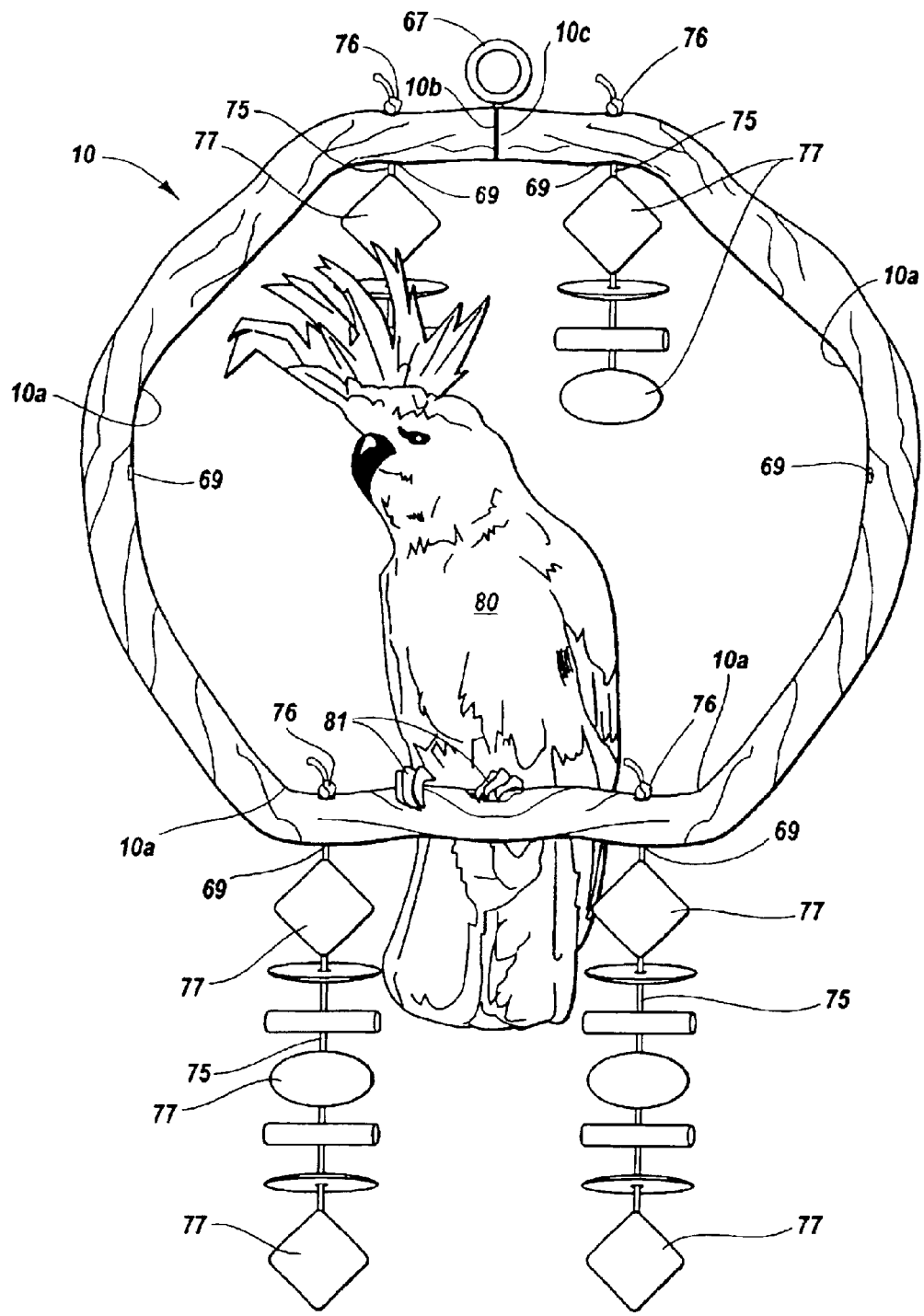
FIG. 8 shows the hexagon shaped ring of FIG. 7 with cords fitted through the drilled holes that are knotted at their ends and each maintains a stack of toy pieces strung thereon, and showing a mounting ring for hanging the toy, with a cockatoo shown perched in the hexagon shaped ring.

FIG. 8 shows the drilled PVC pipe 10 of FIG. 7 as having been fitted with sections of cord 75, preferably a leather cord, that have been passed through the holes 69 and have been knotted at their top ends 76. The sections of cord have been threaded through different shapes and colors of pieces 77, preferably pieces of wood, with the cord lower ends then knotted or fastened to a lower piece 77, to maintain the sections of pieces mounted onto the sections of cord. So arranged, a bird, like a cockatoo 80, shown in FIG. 8, can play with the pieces with their beak while their feet 81 hold onto the pipe surface 17.

Additionally, it should be understood, that, while a toy formed into a loop is shown in FIGS. 6A through 8 as being a use for the grooved and treated PVC pipe 10, it should be understood that the treated PVC pipe 10 can be bent into other shapes, or can be left straight, and can be drilled appropriately to hang items therefrom, or to receive, for example, dowels fitted therethrough to serve a perches for one of more birds, or other pets. Such other arrangements, it should be understood, will fall within the scope of the invention as set out herein, provided they utilize the described plastic pipe that has had its outer surface grooved and treated to change the surface color to a brown and to roughen that surface. In this vein, it should be understood that, while heat treating with an open flame has been set out as a preferred method for changing the pipe surface texture and color, another approach that can be practice could involve a chemical treatment with a chemical that is reactive with the pipe mater that, after the PVC pipe is grooved, is coated onto the surface and the chemical solution is left thereon for a sufficient time period to react with and discolor the pipe surface. Such chemical treatment, it should be understood, is within the scope of this disclosure.

Hereinabove has been set out a description of a preferred pet toy formed from sections of plastic pipe and/or tubes, preferably polyvinyl chloride (PVC) pipe, that is scored or grooved longitudinally, and has had its surface treated to discolor the white pipe surface to brown and to roughen that surface. It should also be understood the invention can be applied to a manufacture of a variety and multitude arrangements of pet toys. Accordingly, it should be understood that the present invention can be varied within the scope of this disclosure without departing from the subject matter coming within the scope of the following claims, and a reasonable equivalency thereof, which claims I regard as my invention.

We claim:

1. A method for manufacturing a pet toy comprising, to a section of a white polyvinyl chloride (PVC) plastic pipe and/or tube, scribing a plurality of longitudinal lines along said plastic pipe or tube outer surface that are randomly spaced apart from one another, from one end of said plastic pipe or tube to the other, and exposing said plastic pipe or outer surface to a direct flame for a short period of time to scorch said outer surface from white to brown, and to roughen said outer surface.

2. The method for manufacturing a pet toy as recited in claim 1, wherein the plastic pipe or tube is held in place; and is scored or grooved longitudinally utilizing a hand held tool.

3. The method for manufacturing a pet toy as recited in claim 2, wherein the plastic pipe or tube is scorched utilizing a hand held torch.

4. The method for manufacturing a pet toy as recited in claim 3, wherein the hand held torch is a propane torch and its flame is held over each section of the surface of the plastic pipe or tube for approximately one second.

5. The method as recited in claim 1, further including spot heating the plastic pipe or tube at a point or points along its surface and said plastic pipe or tube is bent at each said heated spot into a shape of a pet toy; and is fitted with a hanger for suspending it above the ground.

6. The method for manufacturing a pet toy as recited in claim 2, wherein the plastic pipe or tube is scored or grooved longitudinally utilizing a motor driven hand held tool where turning of said motor turns a cutting wheel or disk.

* * * * *